United States Patent
Yang et al.

(10) Patent No.: US 12,381,293 B1
(45) Date of Patent: Aug. 5, 2025

(54) PREPARATION METHOD, APPARATUS, DEVICE AND MEDIUM FOR NO. 5 LITHIUM-ION BATTERY

(71) Applicant: Hamedata Technology Co., Limited, Guangdong (CN)

(72) Inventors: Changjun Yang, Guangdong (CN); Yihan Shi, Guangdong (CN); Pengfei Xiao, Guangdong (CN); Shubao Ke, Guangdong (CN); Jian Zhao, Guangdong (CN); Wei Zhou, Guangdong (CN); Qiang Hou, Guangdong (CN); Guohao Xu, Guangdong (CN)

(73) Assignee: Hamedata Technology Co., Limited, Guangdong (CN)

( * ) Notice: Subject to any disclaimer, the term of this patent is extended or adjusted under 35 U.S.C. 154(b) by 0 days.

(21) Appl. No.: 18/892,708

(22) Filed: Sep. 23, 2024

Related U.S. Application Data

(63) Continuation of application No. PCT/CN2024/112130, filed on Aug. 14, 2024.

(30) Foreign Application Priority Data

Jul. 17, 2024 (CN) .......................... 202410960299.9

(51) Int. Cl.
*H01M 50/564* (2021.01)
*H01M 10/04* (2006.01)
(Continued)

(52) U.S. Cl.
CPC ..... *H01M 50/564* (2021.01); *H01M 10/0404* (2013.01); *H01M 10/0422* (2013.01);
(Continued)

(58) Field of Classification Search
None
See application file for complete search history.

(56) References Cited

U.S. PATENT DOCUMENTS

| | | | | |
|---|---|---|---|---|
| 2007/0273327 A1* | 11/2007 | Daniel | ................ | H01M 50/559 320/110 |
| 2016/0254574 A1* | 9/2016 | Li | ..................... | H01M 10/0525 320/107 |
| 2020/0161713 A1* | 5/2020 | Qin | ..................... | H01M 50/107 |

FOREIGN PATENT DOCUMENTS

| | | | | |
|---|---|---|---|---|
| CN | 101111953 A | | 1/2008 | |
| CN | 106486693 A | * | 3/2017 | ........ H01M 10/0525 |

(Continued)

OTHER PUBLICATIONS

Machine Translation of CN 117996380 A (Year: 2024).*
(Continued)

*Primary Examiner* — Robert S Carrico
(74) *Attorney, Agent, or Firm* — Cooper Legal Group, LLC

(57) ABSTRACT

The present application discloses a preparation method, apparatus, device and medium for a No. 5 lithium-ion battery. The method includes: preparing a battery cell; selecting a steel material and stamping it to obtain an upper steel shell of the battery; determining bending parameters of the spring sheet based on user requirements and attribute parameters of the spring sheet; assembling a PCB board and the upper steel shell based on the bending parameters, bending a negative spring sheet on a side of the PCB board downwards, and bending a positive spring sheet at a bottom of the PCB board downwards, thus obtaining a complete step-down charging terminal; fitting the complete step-down charging terminal onto the battery cell to obtain a semi-finished product; and fixing the semi-finished product by roller pressing, and covering an insulating film on an outside (Continued)

of the semi-finished product to obtain a finished product of the battery.

4 Claims, 6 Drawing Sheets

(51) Int. Cl.
*H01M 10/0525* (2010.01)
*H01M 10/42* (2006.01)
*H01M 50/202* (2021.01)
*H01M 50/224* (2021.01)
*H01M 50/276* (2021.01)
*H01M 50/284* (2021.01)
*H01M 50/559* (2021.01)
*H01M 50/562* (2021.01)

(52) U.S. Cl.
CPC ....... *H01M 10/425* (2013.01); *H01M 50/202* (2021.01); *H01M 50/224* (2021.01); *H01M 50/276* (2021.01); *H01M 50/284* (2021.01); *H01M 50/559* (2021.01); *H01M 50/562* (2021.01); *H01M 10/0525* (2013.01)

(56) References Cited

FOREIGN PATENT DOCUMENTS

| | | | | |
|---|---|---|---|---|
| CN | 206461012 | U | 9/2017 | |
| CN | 110556487 | A * | 12/2019 | ............. B07C 5/344 |
| CN | 112035972 | A | 12/2020 | |
| CN | 215989280 | U | 3/2022 | |
| CN | 116936944 | A | 10/2023 | |
| CN | 117352855 | A | 1/2024 | |
| CN | 117996380 | A * | 5/2024 | .......... H01M 10/052 |
| CN | 221128863 | U | 6/2024 | |
| CN | 118315645 | A * | 7/2024 | ........ H01M 10/0422 |
| CN | 118336174 | A * | 7/2024 | |
| JP | 2019102186 | A | 6/2019 | |

OTHER PUBLICATIONS

First Office Action received in corresponding Chinese patent application No. 202410960299.9, dated Mar. 28, 2025, 13 pages.
International Search Report received in corresponding International Patent Application No. PCT/CN2024/112130, dated Apr. 4, 2025, 8 pages.

* cited by examiner

PREPARATION METHOD, APPARATUS, DEVICE AND MEDIUM FOR NO. 5 LITHIUM-ION BATTERY

CROSS-REFERENCE TO RELATED APPLICATIONS

The present application is a continuation application of PCT application No. PCT/CN2024/112130, filed on Aug. 14, 2024, which claims priority to Chinese patent application No. 202410960299.9, filed on Jul. 17, 2024. The entireties of PCT application No. PCT/CN2024/112130 and Chinese patent application No. 202410960299.9 are hereby incorporated by reference herein and made a part of this specification.

TECHNICAL FIELD

The present application relates to a technical field of battery preparation, and, in particular, to a preparation method, apparatus, device and medium for a No. 5 lithium-ion battery.

BACKGROUND ART

Currently, the No. 5 lithium-ion battery is widely used in portable electronic devices due to its high energy density, long cycle life, and other advantages. However, there are still problems such as complex process and low yield in its preparation, which restrict further industrial development. Existing preparation processes for the No. 5 battery mostly use a soft-package core, which is welded with a step-down circuit and then inserted into a steel shell, making large-scale mass production challenging and necessitating a use of special chargers.

The existing technical solutions mentioned above have the following deficiencies: the existing preparation methods are inadequate in process control, production efficiency, and product quality, leading to difficulties in ensuring a safety of batteries, thus presenting room for improvement.

SUMMARY

In order to improve the safety of lithium-ion batteries, the present application provides a preparation method, apparatus, equipment, and medium for a No. 5 lithium-ion battery.

A first purpose of the present application is achieved through the following technical solutions.

A method for preparing a No. 5 lithium-ion battery, including:

preparing a battery cell based on a preparation process of the battery cell;

selecting a steel material for preparing the battery, stamping the steel material to obtain an upper steel shell of the battery;

acquiring user requirements and attribute parameters of a spring sheet, and determining bending parameters of the spring sheet based on the user requirements and attribute parameters of the spring sheet;

assembling a PCB board and the upper steel shell of the battery based on the bending parameters of the spring sheet, bending a negative spring sheet on a side of the PCB board towards a direction close to the battery cell, so that the negative spring sheet is in elastic contact with the upper steel shell, and bending a positive spring sheet at a bottom of the PCB board towards the direction close to the battery cell, so that the positive spring sheet is in elastic contact with a top of the battery cell, thus obtaining a complete step-down charging terminal;

fitting the complete step-down charging terminal onto the battery cell to obtain a semi-finished product of the battery, and an insulating gasket is arranged between the complete step-down charging terminal and the battery cell; and fixing the semi-finished product of the battery by roller pressing along a groove of the battery cell, and covering an insulating film on an outside of the semi-finished product after being fixed by roller pressing to obtain a finished product of the battery.

By adopting the above technical solution, the battery cell is prepared based on the preparation process of the battery cell. By using a standardized preparation process of the battery cell, a quality and performance of the battery cell can meet design requirements, providing a basic component for subsequent battery assembly. The steel material for preparing the battery is selected, and the steel material is stamped to obtain an upper steel shell of the battery. An appropriate steel material is selected and stamped to form the upper steel shell of the battery, providing mechanical protection and structural support for the battery cell, ensuring an isolation of the battery cell from an external environment. The user requirements and attribute parameters of the spring sheet are acquired, bending parameters of the spring sheet are determined based on the user requirements and attribute parameters of the spring sheet. By analyzing user requirements and physical properties of the spring sheet, a bending angle and shape of the spring sheet is accurately determined to achieve a desired electrical connection and mechanical performance. The PCB board and the upper steel shell of the battery are assembled based on the bending parameters of the spring sheet, the negative spring sheet on the side of the PCB board is bent downwards, so that the negative spring sheet is in elastic contact with the upper steel shell, the positive spring sheet at the bottom of the PCB board is bent downwards, so that the positive spring sheet is in elastic contact with the top of the battery cell, thus the complete step-down charging terminal is obtained. A bent spring sheet is assembled with the PCB board and upper steel shell to form a key part of the electrical connection, ensuring that the positive and negative poles of the battery are correctly connected to a circuit on the PCB board. By precisely bending the spring sheet, the elastic contact with the steel shell and top of the battery cell is achieved, forming a stable electrical connection, and constructing the step-down and charging functions of the battery. The complete step-down charging terminal is fitted onto the battery cell to obtain the semi-finished battery. A terminal assembly is fitted onto the battery cell to complete an assembly of the semi-finished battery, laying a foundation for a final packaging and testing of the battery. The semi-finished product of the battery is fixed by roller pressing along the groove of the battery cell, and an insulating film is covered on the outside of the semi-finished product after being fixed by roller pressing to obtain the finished product of the battery. By using roller pressing for fixation, a structural stability of battery components and a reliability of electrical connections are ensured. The insulation film covered provides additional electrical isolation and environmental protection, completing a final packaging of the battery to produce the finished product suitable for practical applications.

In the present application, the No. 5 lithium-ion battery is a 1.5V constant voltage lithium-ion battery.

In a preferred embodiment of the present application, selecting the steel material for preparing the battery, stamping the steel material to obtain the upper steel shell of the battery, includes:

acquiring attribute data of the battery, determining stamping parameters of the steel material based on the attribute data of the battery; and stamping the steel material based on the stamping parameters of the steel material to obtain the upper steel shell of the battery.

By adopting the above technical solution, battery attribute data are obtained and stamping parameters of the steel material are determined based on the attribute data of the battery. By analyzing the attribute data of the battery, selecting appropriate steel types and specifications, and determining key parameters during the stamping process, it is ensured that the steel material can meet requirements of a battery design, while also ensuring a feasibility and efficiency of the stamping process. The steel material is stamped based on the stamping parameters of the steel material to obtain the upper steel shell of the battery. Using the determined stamping parameters, the steel is practically stamped and processed to form the upper steel shell of the battery, achieving a physical shape of the battery shell and providing mechanical protection for the battery cell, ensuring a structural integrity of the battery.

In a preferred embodiment of the present application, the upper steel shell of the battery is provided with a first through-hole and a second through-hole, the first through-hole is opened at a first end of the upper steel shell close to the battery cell, the second through-hole is opened at a second end of the upper steel shell away from the battery cell, and a diameter of the first through-hole is larger than that of the second through-hole, wherein the diameter of the first through-hole is greater than 14 mm.

By adopting the above technical solution, the upper steel shell of the battery is provided with a first through-hole and a second through-hole, the first through-hole is opened at a bottom of the upper steel shell, the second through-hole is opened at a top of the upper steel shell, and the diameter of the first through-hole is larger than that of the second through-hole, wherein the diameter of the first through-hole is greater than 14 mm.

In a preferred embodiment of the present application, acquiring user requirements and attribute parameters of the spring sheet and determining bending parameters of the spring sheet based on the user requirements and attribute parameters of the spring sheet, includes:

inputting the user requirements and attribute parameters of the spring sheet into a pre-trained bending model for comparative analysis to obtain an analysis result; and determining the bending parameters of the spring sheet based on the analysis result, wherein the bending parameters of the spring sheet include angular parameters and contact surface parameters of the spring sheet.

By adopting the above technical solution, user requirements and attribute parameters of the spring sheet are input into the pre-trained bending model for comparative analysis to obtain the analysis result. By inputting specific user requirements and the physical property data of the spring sheet into a trained bending model, a predictive ability of the model can be used to analyze the performance of the spring sheet under different conditions. This comparative analysis provides preliminary feedback on whether the spring sheet design meets the user's needs, providing a basis for subsequent design adjustments. Based on the analysis result, the bending angle and contact surface parameters of the spring sheet are determined to ensure that the spring sheet can achieve the desired performance in practical applications.

In a preferred embodiment of the present application, the method for preparing a No. 5 lithium-ion battery further includes:

acquiring attribute parameters and corresponding bending degree data of spring sheets made of various materials, preprocessing the attribute parameters and corresponding bending degree data of spring sheets made of various materials to obtain a training set; and building a bending model based on a decision tree algorithm, training the bending model through forward and backward propagation using the training set, and optimizing the bending model after being trained through forward and backward propagation using a genetic algorithm to obtain the pre-trained bending model.

By adopting the above technical solution, attribute parameters and corresponding bending degree data of spring sheets made of various materials are acquired and preprocessed to create the training set, ensuring a quality of the training set. The bending model is built based on the decision tree algorithm, trained through forward and backward propagation using the training set, and then the bending model after being trained through forward and backward propagation is optimized using the genetic algorithm to obtain the pre-trained bending model, improving the efficiency and accuracy of the spring sheet bending process.

In a preferred example of the present application, determining the bending parameters of the spring sheet based on the analysis result, wherein the bending parameters of the spring sheet include angular parameters and contact surface parameters of the spring sheet, includes:

determining a bending angle and the contact surface parameters from the analysis result based on the user requirements and attribute parameters of the spring sheet;

performing a simulation test on the bending angle and contact surface parameters to obtain a result of the simulation test; and determining the bending angle and contact surface parameters of the spring sheet based on the result of the simulation test.

By adopting the above technical solution, the bending angle and contact surface parameters are determined from the analysis result based on user requirements and attribute parameters of the spring sheet; the simulation test on the bending angle and contact surface parameters is performed, and the result of the simulation test is obtained; the bending angle and contact surface parameters of the spring sheet were determined based on the result of the simulation test, improving the reliability and quality of the battery.

A second purpose of the present application is achieved through the following technical solutions.

An apparatus for preparing a No. 5 lithium-ion battery, including:

a battery cell preparation module for preparing the battery cell based on a preparation process of the battery cell;

a stamping module for selecting a steel material for preparing the battery and stamping the steel material to obtain an upper steel shell of the battery;

a bending determination module for acquiring user requirements and attribute parameters of a spring sheet, and determining bending parameters of the spring sheet based on the user requirements and attribute parameters of the spring sheet;

an assembly module for assembling a PCB board and the upper steel shell of the battery based on the bending parameters of the spring sheet, bending a negative spring sheet on a side of the PCB board towards a direction close to the battery cell, so that the negative spring sheet is in elastic contact with the upper steel shell, and bending a positive spring sheet at a bottom of the PCB board towards the direction close to the battery cell, so that the positive spring sheet is in elastic contact with a top of the battery cell, thus obtaining a complete step-down charging terminal;

a fitting module for fitting the complete step-down charging terminal onto the battery cell to obtain a semi-finished product of the battery, and an insulating gasket is arranged between the complete step-down charging terminal and the battery cell; and a roller pressing module for fixing the semi-finished product of the battery by roller pressing along a groove of the battery cell, and covering an insulating film on an outside of the semi-finished product after being fixed by roller pressing to obtain a finished product of the battery.

By adopting the above technical solution, the battery cell is prepared based on the preparation process of battery cell. By using a standardized preparation process of battery cell, the quality and performance of the battery cell can meet design requirements, providing a basic component for subsequent battery assembly. The steel material for preparing the battery is selected, the steel material is stamped to obtain the upper steel shell of the battery. An appropriate steel material is selected and stamped to form the upper steel shell of the battery, providing mechanical protection and structural support for the battery cell, ensuring the isolation of the battery cell from the external environment. The user requirements and attribute parameters of the spring sheet are acquired, bending parameters of the spring sheet are determined based on the user requirements and attribute parameters of the spring sheet. By analyzing user requirements and physical properties of the spring sheet, the bending angle and shape of the spring sheet is accurately determined to achieve the desired electrical connection and mechanical performance. The PCB board and the upper steel shell of the battery are assembled based on the bending parameters of the spring sheet, the negative spring sheet on the side of the PCB board is bent downwards, so that the negative spring sheet is in elastic contact with the upper steel shell, the positive spring sheet at the bottom of the PCB board is bent downwards, so that the positive spring sheet is in elastic contact with the top of the battery cell, thus a complete step-down charging terminal is obtained. A bent spring sheet is assembled with the PCB board and upper steel shell to form a key part of the electrical connection, ensuring that the positive and negative poles of the battery are correctly connected to the circuit on the PCB board. By precisely bending the spring sheet, the elastic contact with the steel shell and top of the battery cell is achieved, forming a stable electrical connection, and constructing the step-down and charging functions of the battery. The complete step-down charging terminal is fitted onto the battery cell to obtain the semi-finished battery. A terminal assembly is fitted onto the battery cell to complete an assembly of the semi-finished battery, laying a foundation for a final packaging and testing of the battery. The semi-finished product of the battery is fixed by roller pressing along the groove of the battery cell, and the insulating film is covered on the outside of the semi-finished product after being fixed by roller pressing to obtain the finished product of the battery. By using roller pressing for fixation, the structural stability of battery components and the reliability of electrical connections are ensured. The insulation film covered provides additional electrical isolation and environmental protection, completing the final packaging of the battery to produce the finished product suitable for practical applications.

A third purpose of the present application is achieved through the following technical solutions.

A computer device, including a memory, a processor, and a computer program stored in the memory and executable on the processor, wherein the processor, when executing the computer program, implements steps of the method for preparing a No. 5 lithium-ion battery as described above.

A fourth purpose of the present application is achieved through the following technical solutions.

A computer-readable storage medium, wherein the computer-readable storage medium stores a computer program; and the computer program, when executed by a processor, implements steps of the method for preparing a No. 5 lithium-ion battery as described above.

In summary, the present application includes at least the following beneficial technical effects.

1. The battery cell is prepared based on the preparation process of battery cell. By using a standardized preparation process of battery cell, the quality and performance of the battery cell can meet design requirements, providing a basic component for subsequent battery assembly. The steel material for preparing the battery is selected, the steel material is stamped to obtain the upper steel shell of the battery. An appropriate steel material is selected and stamped to form the upper steel shell of the battery, providing mechanical protection and structural support for the battery cell, ensuring the isolation of the battery cell from the external environment. The user requirements and attribute parameters of the spring sheet are acquired, bending parameters of the spring sheet are determined based on the user requirements and attribute parameters of the spring sheet. By analyzing user requirements and physical properties of the spring sheet, the bending angle and shape of the spring sheet is accurately determined to achieve the desired electrical connection and mechanical performance.

2. The PCB board and the upper steel shell of the battery are assembled based on the bending parameters of the spring sheet, the negative spring sheet on the side of the PCB board is bent downwards, so that the negative spring sheet is in elastic contact with the upper steel shell, the positive spring sheet at the bottom of the PCB board is bent downwards, so that the positive spring sheet is in elastic contact with the top of the battery cell, thus a complete step-down charging terminal is obtained. A bent spring sheet is assembled with the PCB board and upper steel shell to form a key part of the electrical connection, ensuring that the positive and negative poles of the battery are correctly connected to the circuit on the PCB board. By precisely bending the spring sheet, the elastic contact with the steel shell and top of the battery cell is achieved, forming a stable electrical connection, and constructing the step-down and charging functions of the battery. The complete step-down charging terminal is fitted onto the battery cell to obtain the semi-finished battery. A terminal assembly is fitted onto the battery cell to complete an assembly of the semi-finished battery, laying a foundation for a final packaging and testing of the battery. The semi-finished product of the battery is fixed by roller pressing along the groove of the battery cell, and the insulating film is covered on the outside of the semi-finished product after being fixed by roller pressing to obtain the finished product of the battery. By using roller pressing for fixation, the structural stability of battery components and the reliability of electrical connections are ensured. The insulation film covered provides additional electrical isolation and environmental protection, completing the final packaging of the battery to produce the finished product suitable for practical applications.

DETAILED DESCRIPTION

The present application will be further described in detail below with reference to the drawings.

Figure 1:
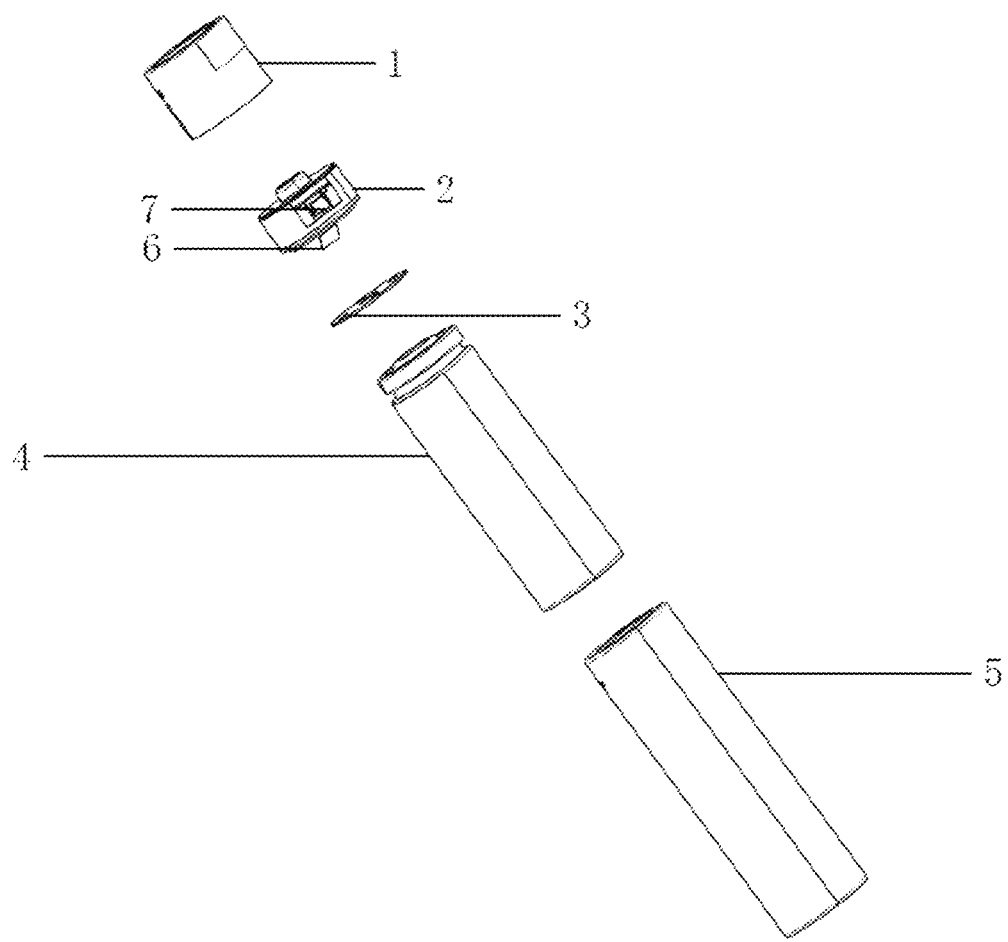
FIG. 1 is a schematic view of an overall structure of a No. 5 lithium-ion battery described in the present application.
Figure 2:
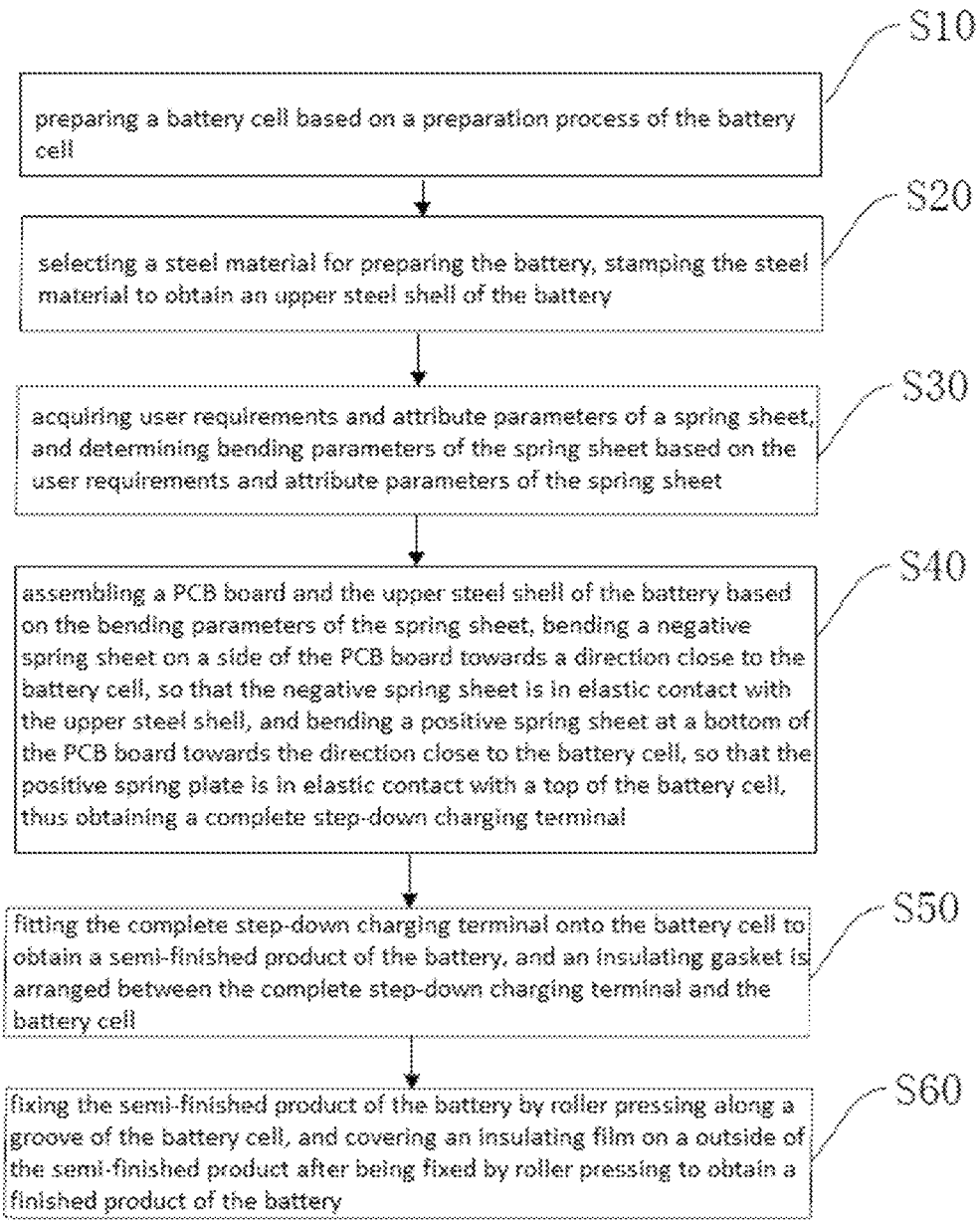
FIG. 2 is a flowchart of a method for preparing a No. 5 lithium-ion battery in an embodiment of the present application.

In one embodiment, as shown in FIG. 2, the present application discloses a method for preparing a No. 5 lithium-ion battery, specifically including the following steps.

S10: Preparing a battery cell based on a preparation process of the battery cell.

Specifically, first of all, based on design requirements of the battery, a positive electrode material, a negative electrode material, a binder, a conductive agent, and a solvent are mixed in a certain proportion. A prepared positive electrode slurry is uniformly coated on an aluminum foil, and a prepared negative electrode slurry is coated on a copper foil. During a coating process, a coating speed and coating thickness need to be controlled to ensure a uniformity and consistency of the electrode plates. After coating, the electrode plates undergo a drying process to remove the solvent, leaving a uniform distribution of active materials and binders. A dried electrode plate is compacted using a roller press, and a rolled electrode plate is cut into a required size, and then die-cut into shapes needed for the battery by a die-cutting machine. The cut and die-cut positive and negative plates are alternately placed with separators and then wound into rolls or stacked in layers to form a preliminary structure of the battery cell.

S20: Selecting a steel material for preparing the battery, stamping the steel material to obtain an upper steel shell of the battery.

Specifically, to improve the safety of the battery, it is necessary to select an appropriate steel material for the battery shell. After selecting the steel material, the steel material needs to be cut into a size suitable for stamping. This step may include cutting, trimming, and other preprocessing work to ensure that the size and shape of the steel material are suitable for subsequent stamping processes. After stamping, the upper steel shell of the battery, which is an upper cover part of the battery, is obtained. The upper steel shell is usually designed with threads or other connection mechanisms to tightly fit with a lower shell of the battery and ensure that an electrolyte does not leak.

S30: Acquiring user requirements and attribute parameters of a spring sheet, and determining bending parameters of the spring sheet based on the user requirements and attribute parameters of the spring sheet.

Specifically, first of all, it is necessary to communicate with users to understand their specific requirements for a product, which may include a functionality, performance, dimensions, shape, operating environment, durability, and the like of the product. Based on the user requirements and attribute parameters of the spring sheet, engineers need to determine a bending design of the spring sheet to determine a degree of bending of the spring sheet, making an overall structure of the battery design safer.

S40: Assembling a PCB board and the upper steel shell of the battery based on the bending parameters of the spring sheet, bending a negative spring sheet on a side of the PCB board towards a direction close to the battery cell, so that the negative spring sheet is in elastic contact with the upper steel shell, and bending a positive spring sheet at a bottom of the PCB board towards the direction close to the battery cell, so that the positive spring sheet is in elastic contact with a top of the battery cell, thus obtaining a complete step-down charging terminal.

Specifically, before assembly, it is necessary to determine the bending parameters of the spring sheet, which include a bending angle, bending radius, and bending shape, etc. These parameters will affect an contact effect and a reliability of electrical connection between the spring sheet, the PCB board, and other components. The PCB board is positioned in an appropriate position, then the upper steel shell of the battery is aligned with the PCB board and fixed with adhesive. The negative spring sheet on the side of the PCB board is bent towards the direction of close to the battery cell, so that the negative spring sheet is in elastic contact with the upper steel shell. The positive spring sheet at the bottom of the PCB board is bent towards the direction close to the battery cell, so that the positive spring sheet is in elastic contact with the top of the battery cell. Through the above steps, the negative and positive spring sheets are respectively in elastic contact with the upper steel shell of the battery and the top of the battery cell, forming a complete electrical connection path. This path serves as the step-down charging terminal because it allows current to flow from the battery cell to the PCB board, thereby achieving voltage regulation and battery charging.

S50: Fitting the complete step-down charging terminal on the battery cell to obtain a semi-finished product of the battery, and an insulating gasket is arranged between the complete step-down charging terminal and the battery cell.

Specifically, the complete step-down charging terminal is fitted onto the battery cell, the spring sheets of the terminal are aligned with the positive and negative contact areas of the battery cell, respectively. A bent part of the negative spring sheet should be in elastic contact with the negative electrode area of the battery cell, i.e., the upper steel shell of the battery, while the bent part of the positive spring sheet should be in elastic contact with the top of the battery cell. After fitting the step-down charging terminal, it is necessary to check whether the contact between the spring sheet and the battery cell is good, to ensure that there is no risk of poor contact or short circuit, and ultimately obtain the semi-finished product of the battery.

S60: Fixing the semi-finished product of the battery by roller pressing along a groove of the battery cell, and covering an insulating film on an outside of the semi-finished product after being fixed by roller pressing to obtain a finished product of the battery.

Specifically, some specific designs on the battery cell shell, such as grooves or rolled edges, are used to increase the structural stability of the battery components. The semi-finished product of the battery is fixed by roller pressing along the groove of the battery cell, and the semi-finished product of the battery are compacted along the groove using a pressure machinery to ensure a tight fit between the battery cell and the shell or terminals, preventing displacement or loosening during battery use. The insulating film is further covered on the outside of the semi-finished product after being fixed by roller pressing to obtain the finished product of the battery.

By adopting the above technical solution, the battery cell is prepared based on the preparation process of battery cell. By using a standardized preparation process of battery cell, the quality and performance of the battery cell can meet design requirements, providing a basic component for subsequent battery assembly. The steel material for preparing the battery is selected, the steel material is stamped to obtain the upper steel shell of the battery. An appropriate steel material is selected and stamped to form the upper steel shell of the battery, providing mechanical protection and structural support for the battery cell, ensuring the isolation of the battery cell from the external environment. The user requirements and attribute parameters of the spring sheet are acquired, bending parameters of the spring sheet are determined based on the user requirements and attribute parameters of the spring sheet. By analyzing user requirements and physical properties of the spring sheet, the bending angle and shape of the spring sheet is accurately determined to achieve the desired electrical connection and mechanical performance. The PCB board and the upper steel shell of the battery are assembled based on the bending parameters of the spring sheet, the negative spring sheet on the side of the PCB board is bent downwards, so that the negative spring sheet is in elastic contact with the upper steel shell, the positive spring sheet at the bottom of the PCB board is bent downwards, so that the positive spring sheet is in elastic contact with the top of the battery cell, thus a complete step-down charging terminal is obtained. A bent spring sheet is assembled with the PCB board and upper steel shell to form a key part of the electrical connection, ensuring that the positive and negative poles of the battery are correctly connected to the circuit on the PCB board. By precisely bending the spring sheet, the elastic contact with the steel shell and top of the battery cell is achieved, forming a stable electrical connection, and constructing the step-down and charging functions of the battery. The complete step-down charging terminal is fitted onto the battery cell to obtain the semi-finished battery. A terminal assembly is fitted onto the battery cell to complete an assembly of the semi-finished battery, laying a foundation for a final packaging and testing of the battery. The semi-finished product of the battery is fixed by roller pressing along the groove of the battery cell, and the insulating film is covered on the outside of the semi-finished product after being fixed by roller pressing to obtain the finished product of the battery. By using roller pressing for fixation, the structural stability of battery components and the reliability of electrical connections are ensured. The insulation film covered provides additional electrical isolation and environmental protection, completing the final packaging of the battery to produce the finished product suitable for practical applications.

Figure 3:
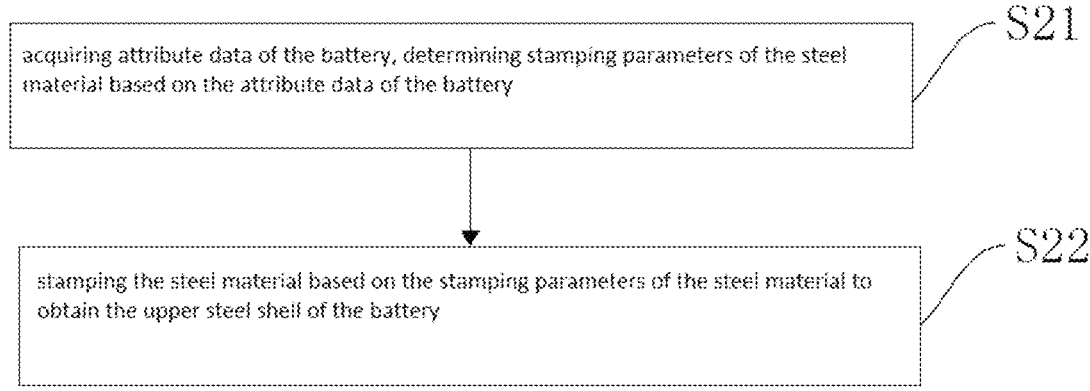
FIG. 3 is a flowchart showing an implementation of step S20 in a method for preparing a No. 5 lithium-ion battery in an embodiment of the present application.

In one embodiment, as shown in FIG. 3, step S20 involves selecting the steel material for the battery and stamping the steel material to obtain the upper steel shell of the battery, specifically including the following steps.

S21: Acquiring attribute data of the battery, determining stamping parameters of the steel material based on the attribute data of the battery.

Specifically, before designing and manufacturing the battery, it is necessary to first understand the attribute data of the battery, which may include a size, shape, capacity, voltage, chemical composition, expected load, and operating temperature range and the like of the battery. Based on the attribute data of the battery, engineers can determine the specific parameters required for steel stamping, including a thickness, hardness, and tensile strength of the steel, as well as a force, speed, mold design and the like needed during the stamping process. For example, if the battery needs to withstand higher internal pressure, a thicker or higher strength steel material may need to be selected and the stamping pressure adjusted accordingly.

S22: Stamping the steel material based on the stamping parameters of the steel material to obtain the upper steel shell of the battery.

Specifically, after determining the stamping parameters, a next step is to process the steel material using a stamping machine. During the stamping process, the steel material is placed in a mold, and a force is applied through a press machine to deform the steel material and form a desired shape. After stamping, the upper steel shell of the battery is obtained.

Figure 4:
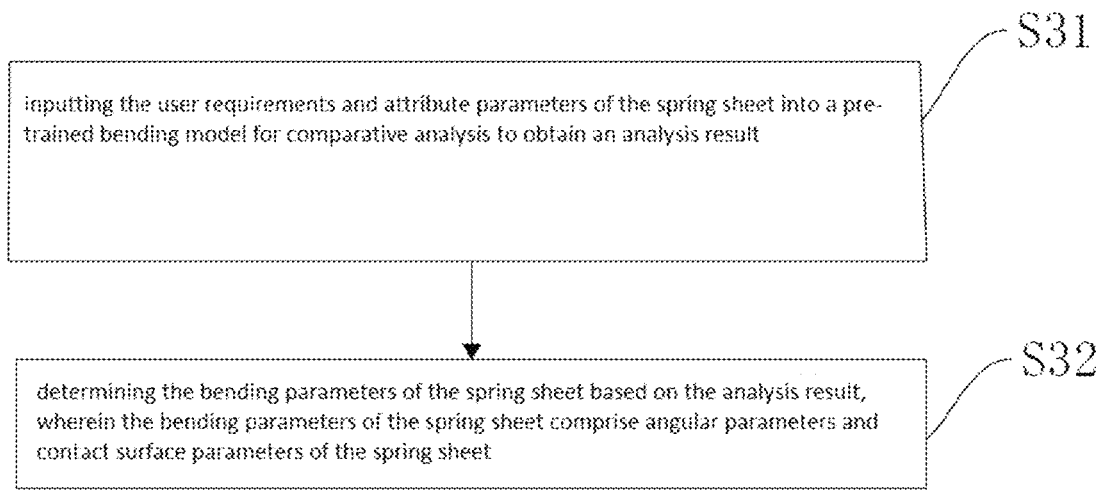
FIG. 4 is a flowchart showing an implementation of step S30 in a method for preparing a No. 5 lithium-ion battery in an embodiment of the present application.

In one embodiment, as shown in FIG. 4, step S30 involves acquiring user requirements and attribute parameters of the spring sheet, and determining the bending parameters of the spring sheet based on the user requirements and attribute parameters of the spring sheet, specifically including the following steps.

S31: Inputting the user requirements and attribute parameters of the spring sheet into a pre-trained bending model for comparative analysis to obtain an analysis result.

Specifically, first of all, it is necessary to collect and understand the specific requirements of users for the spring sheet. The user requirements and the attribute data of the spring sheet are input into an analysis model, which compares and analyzes the requirements against the attribute data of the spring sheet to determine whether they meet user requirements. After the analysis, the model provides results, which include performance evaluations of the spring sheet under different bending conditions, potential problem points, and suggestions for improvement.

S32: Determining the bending parameters of the spring sheet based on the analysis result, wherein the bending parameters of the spring sheet include angular parameters and contact surface parameters of the spring sheet.

Specifically, the angle parameter is a key factor in determining the tightness and elastic force of the spring sheet in contact with the contact surface. Therefore, based on the analysis result, a specific angle at which the spring sheet needs to be bent can be determined. If the analysis result shows that the current design does not meet user requirements, it may be necessary to adjust the design of the spring sheet, such as changing the material, size, or bending shape, and then reanalyze until a solution that meets all requirements is found.

Figure 5:
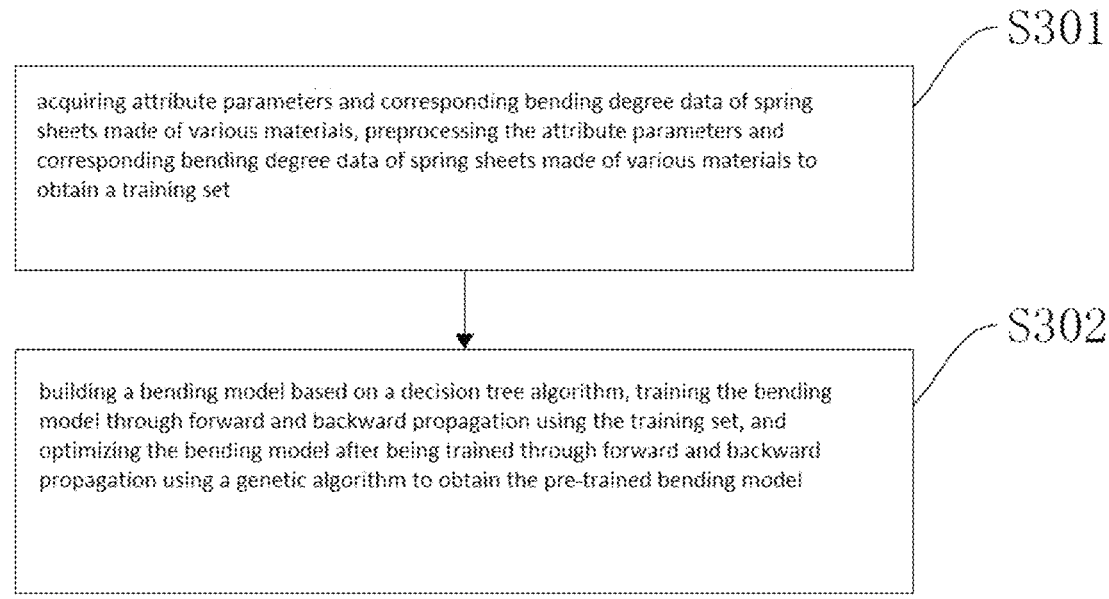
FIG. 5 is a flowchart showing an implementation of step S31 in a method for preparing a No. 5 lithium-ion battery in an embodiment of the present application.

In one embodiment, as shown in FIG. 5, step S31 involves inputting the user requirements and attribute parameters of the spring sheet into the pre-trained bending model for comparative analysis to obtain the analysis result, and a method of obtaining the pre-trained bending model specifically includes the following steps.

S301: Acquiring attribute parameters and corresponding bending degree data of spring sheets made of various materials, preprocessing the attribute parameters and corresponding bending degree data of spring sheets made of various materials to obtain a training set.

Specifically, first of all, it is necessary to collect attribute parameters of spring sheets made of different materials, which include material type, size, elastic coefficient, tensile strength, yield strength, etc. At the same time, the bending degree data of each material spring sheet under different bending conditions is collected, including bending angle, bending radius, etc. A collected data is preprocessed to facilitate subsequent model training, and a preprocessed data is organized into a format suitable for model training, forming the training set.

S302: Building a bending model based on a decision tree algorithm, training the bending model through forward and backward propagation using the training set, and optimizing the bending model after being trained through forward and backward propagation using a genetic algorithm to obtain the pre-trained bending model.

Specifically, the bending model is built based on the decision tree algorithm, trained through forward and backward propagation using the training set, and then the bending model after being trained through forward and backward propagation is optimized using the genetic algorithm to obtain the pre-trained bending model. After training through forward and backward propagation, combined with genetic algorithm optimization, the pre-trained bending model is finally obtained, which can predict a bending behavior of the spring sheet under specific conditions based on the attribute parameters of the spring sheet.

Figure 6:
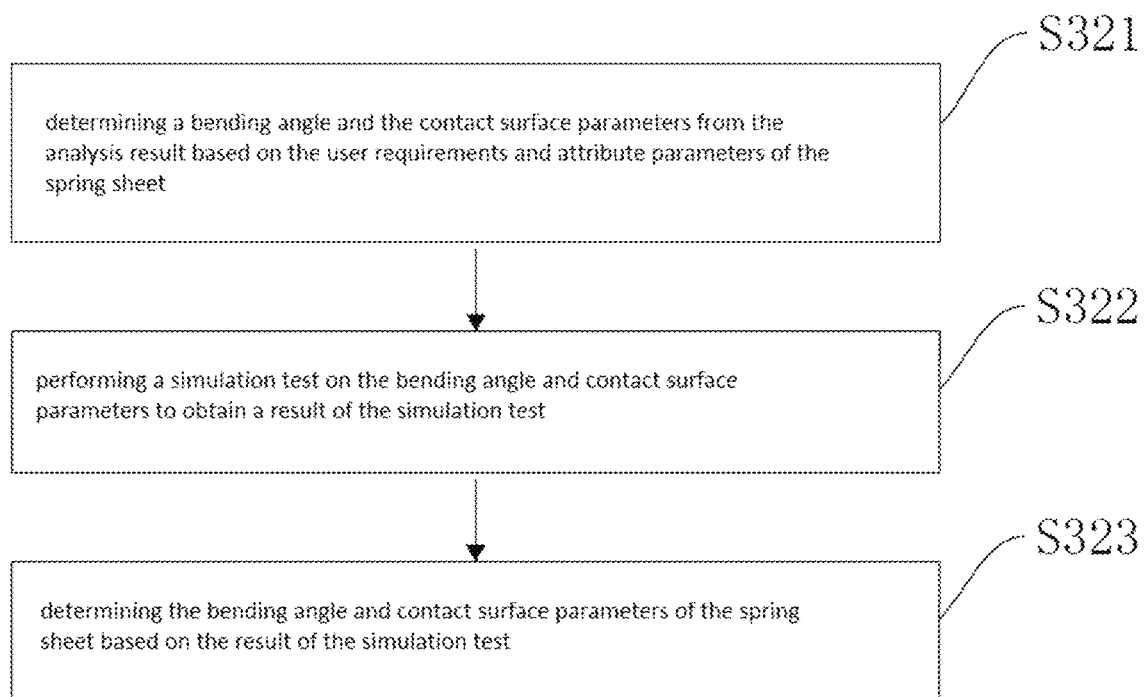
FIG. 6 is a flowchart showing an implementation of step S32 in a method for preparing a No. 5 lithium-ion battery in an embodiment of the present application.

In one embodiment, as shown in FIG. 6, step S32 involves determining angular parameters and contact surface parameters of the spring sheet based on the analysis result, specifically including the following steps.

S321: Determining a bending angle and the contact surface parameters from the analysis result based on the user requirements and attribute parameters of the spring sheet.

Specifically, by utilizing the user requirements and the attribute parameters of the spring sheet, the bending angle and contact surface parameters are determined through analysis. The bending angle determines an extent of deformation of the spring sheet, while the contact surface parameters affect a contact effect between the spring sheet and other components.

S322: Performing a simulation test on the bending angle and contact surface parameters to obtain a result of the simulation test.

Specifically, a computer-aided simulation test is performed on the preliminarily determined bending angle and contact surface parameters. The simulation test can predict the performance of the spring sheet in practical applications without physically manufacturing the spring sheet. After completing the simulation test, a simulation result data is analyzed to evaluate whether a bending performance of the spring sheet meets design requirements and user needs, including checking whether the maximum stress is within a bearing range of the material and whether the deformation of the spring sheet meets expectations.

S323: Determining the bending angle and contact surface parameters of the spring sheet based on the result of the simulation test.

Specifically, if the simulation test result indicates that the current bending angle or contact surface parameters do not meet the requirements, these parameters need to be adjusted. After adjusting the parameters, the simulation test is performed again to verify the performance of the spring sheet with new parameters. After a series of simulation tests and parameter adjustments, a set of bending angle and contact surface parameters that meet user needs and design standards is finally determined.

It should be understood that the numbering of the steps in the above embodiments does not imply an order of execution. The order of execution of each process should be determined by its function and inherent logic and should not impose any limitation on an implementation of the embodiments of the present application.

Figure 7:
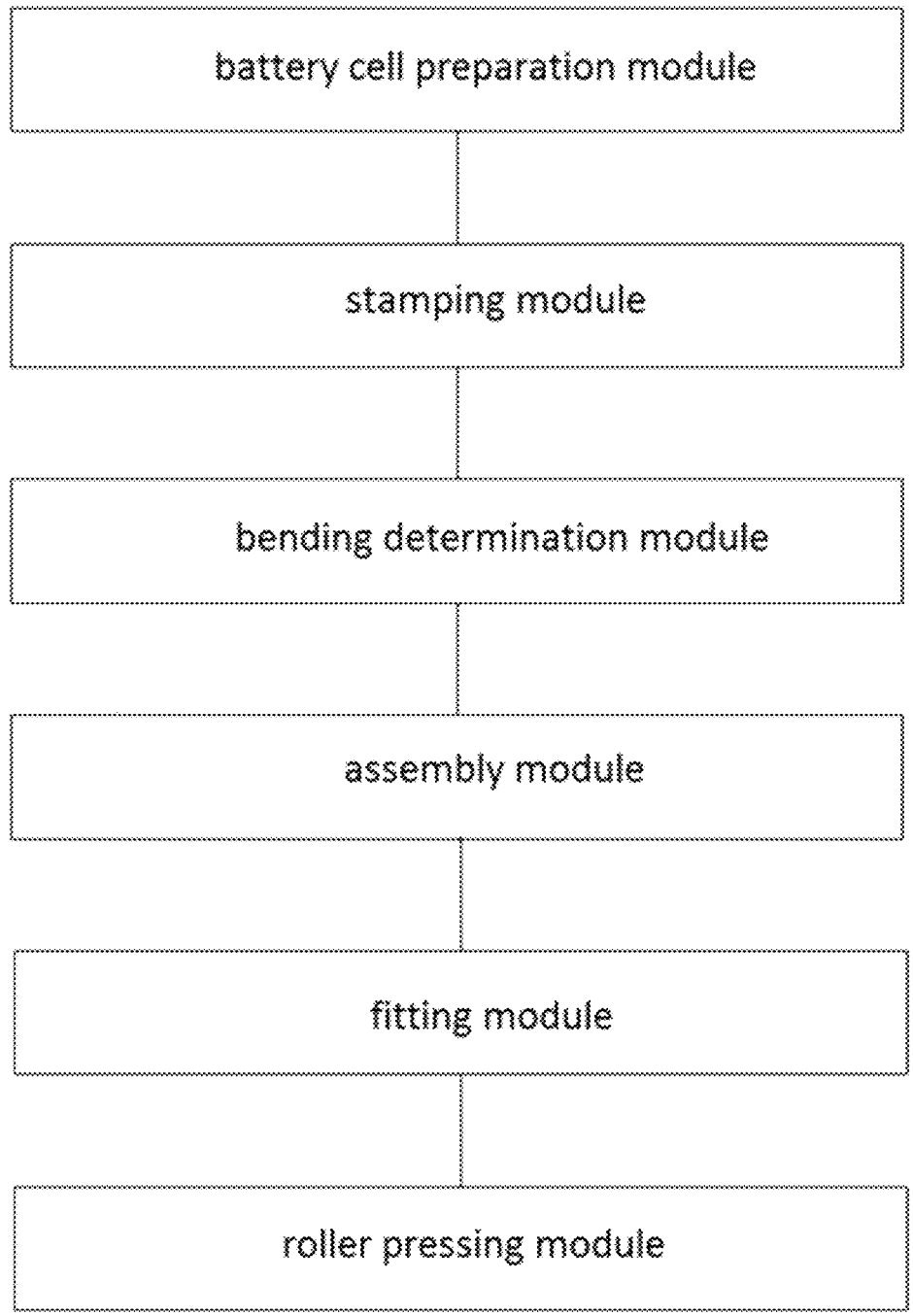
FIG. 7 is a block view of an apparatus for preparing a No. 5 lithium-ion battery in an embodiment of the present application.

In one embodiment, an apparatus for preparing a No. 5 lithium-ion battery is provided, which corresponds to the method for preparing a No. 5 lithium-ion battery as described in the above embodiments. As shown in FIG. 7, the apparatus for preparing a No. 5 lithium-ion battery includes a battery cell preparation module, a stamping module, a bending determination module, an assembly module, a fitting module, and a roller pressing module. Detailed descriptions of each functional module are as follows.

The battery cell preparation module for preparing the battery cell based on a battery cell preparation process;

the stamping module for selecting a steel material for preparing the battery and stamping the steel material to obtain an upper steel shell of the battery;

the bending determination module for acquiring user requirements and attribute parameters of a spring sheet, and determining bending parameters of the spring sheet based on the user requirements and attribute parameters of the spring sheet;

the assembly module for assembling a PCB board and the upper steel shell of the battery based on the bending parameters of the spring sheet, bending a negative spring sheet on a side of the PCB board towards a direction close to the battery cell, so that the negative spring sheet is in elastic contact with the upper steel shell, and bending a positive spring sheet at a bottom of the PCB board towards the direction close to the battery cell, so that the positive spring sheet is in elastic contact with a top of the battery cell, thus obtaining a complete step-down charging terminal;

the fitting module for fitting the complete step-down charging terminal onto the battery cell to obtain a semi-finished product of the battery, and an insulating gasket is arranged between the complete step-down charging terminal and the battery cell; and the roller pressing module for fixing the semi-finished product of the battery by roller pressing along a groove of the battery cell, and covering an insulating film on an outside of the semi-finished product after being fixed by roller pressing to obtain a finished product of the battery.

Optionally, the stamping module includes:

a stamping parameter determination submodule for acquiring attribute data of the battery and determining stamping parameters of the steel material based on the attribute data of the battery; and a steel shell stamping submodule for stamping the steel material based on the stamping parameters of the steel material to obtain the upper steel shell of the battery.

Optionally, the bending determination module includes:

an analysis submodule for inputting the user requirements and attribute parameters of the spring sheet into a pre-trained bending model for comparative analysis to obtain an analysis result; and a parameter determination submodule for determining the bending parameters of the spring sheet based on the analysis result, wherein the bending parameters of the spring sheet include angular parameters and contact surface parameters of the spring sheet.

Optionally, the analysis submodule includes:

a training set acquisition unit for acquiring attribute parameters and corresponding bending degree data of spring sheets made of various materials, preprocessing the attribute parameters and corresponding bending degree data of spring sheets made of various materials to obtain a training set; and a training unit for building a bending model based on a decision tree algorithm, training the bending model through forward and backward propagation using the training set, and optimizing the bending model after being trained through forward and backward propagation using a genetic algorithm to obtain the pre-trained bending model.

Optionally, the parameter determination submodule includes:

an attribute parameter determination unit for determining a bending angle and the contact surface parameters from the analysis result based on the user requirements and attribute parameters of the spring sheet;

a simulation testing unit for performing a simulation test on the bending angle and contact surface parameters to obtain a result of the simulation test; and a contact surface parameter determination unit for determining the bending angle and contact surface parameters of the spring sheet based on the result of the simulation test.

Specific limitations of the apparatus for preparing a No. 5 lithium-ion battery can be found in the previous section on limitations of the method for preparing a No. 5 lithium-ion battery, which will not be repeated here. Various modules in the apparatus for preparing a No. 5 lithium-ion battery can be fully or partially implemented through software, hardware, and their combinations. The above modules can be embedded in hardware form or independent of a processor in a computer device, or stored in software form in a memory of the computer device, so that the processor can call and execute the corresponding operations of the above modules.

Figure 8:
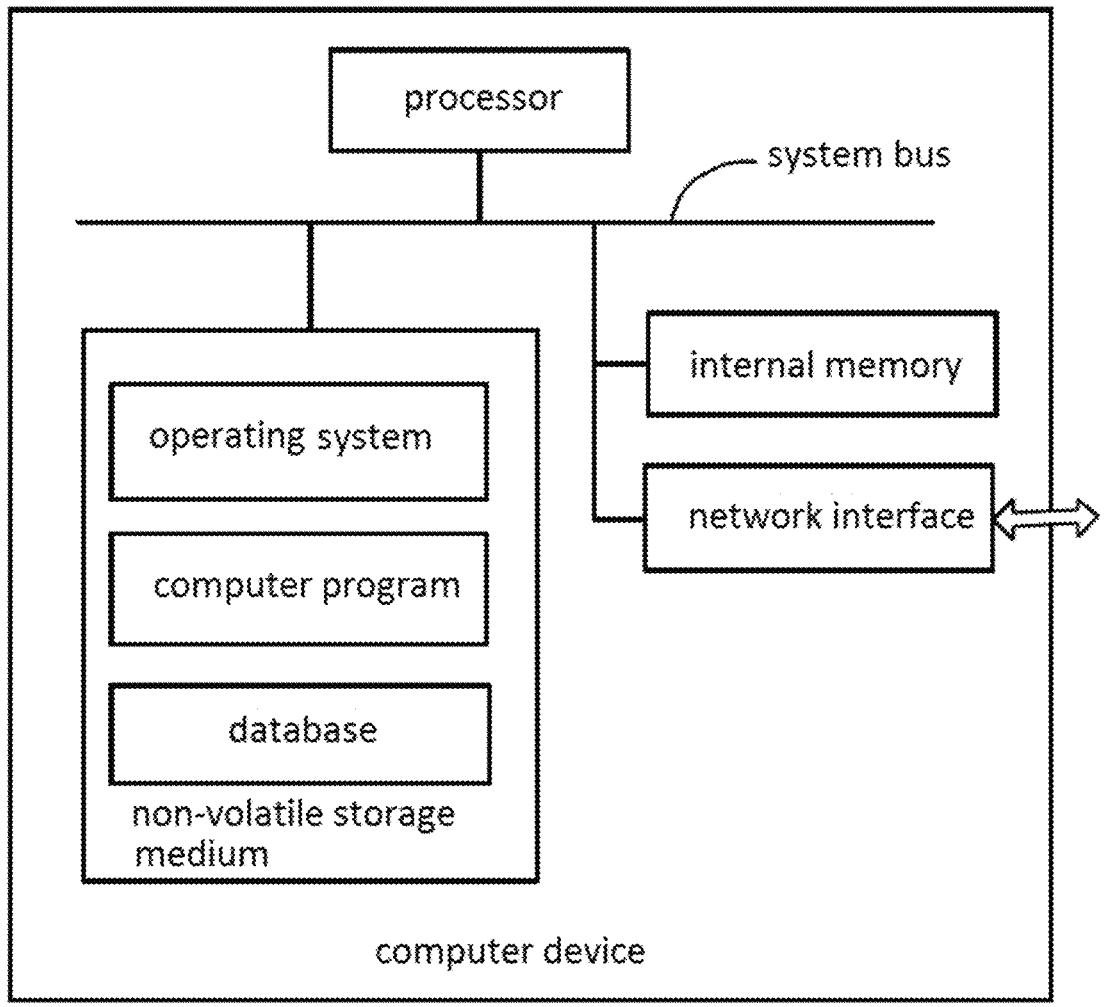
FIG. 8 is a schematic view of an internal structure of a computer device in an embodiment of the present application.

In one embodiment, a computer device is provided, which can be a server, and an internal structure view of the computer device can be as shown in FIG. 8. The computer device includes a processor, a memory, a network interface, and a database connected through a system bus. Among them, the processor of the computer device is used to provide computational and control capabilities. The memory of the computer device includes a non-volatile storage medium and an internal memory. The non-volatile storage medium stores an operating system, a computer program, and a database. The internal memory provides an environment for running the operating system and the computer program stored in the non-volatile storage medium. The network interface of the computer device is used for communication with external terminals through a network connection. When executed by the processor, the computer program implements the method for preparing a No. 5 lithium-ion battery.

In one embodiment, a computer device is provided, including a memory, a processor, and a computer program stored in the memory and executable on the processor; the processor, when executing the computer program, implements the following steps.

Preparing a battery cell based on a preparation process of the battery cell;

selecting a steel material for preparing the battery, stamping the steel material to obtain an upper steel shell of the battery;

acquiring user requirements and attribute parameters of a spring sheet, and determining bending parameters of the spring sheet based on the user requirements and attribute parameters of the spring sheet;

assembling a PCB board and the upper steel shell of the battery based on the bending parameters of the spring sheet, bending a negative spring sheet on a side of the PCB board towards a direction close to the battery cell, so that the negative spring sheet is in elastic contact with the upper steel shell, and bending a positive spring sheet at a bottom of the PCB board towards the direction close to the battery cell, so that the positive spring sheet is in elastic contact with a top of the battery cell, thus obtaining a complete step-down charging terminal;

fitting the complete step-down charging terminal onto the battery cell to obtain a semi-finished product of the battery, and an insulating gasket is arranged between the complete step-down charging terminal and the battery cell; and fixing the semi-finished product of the battery by roller pressing along a groove of the battery cell, and covering an insulating film on an outside of the semi-finished product after being fixed by roller pressing to obtain a finished product of the battery.

In one embodiment, a computer-readable storage medium is provided, wherein the computer-readable storage medium stores a computer program, and the computer program, when executed by a processor, implements the following steps.

Preparing a battery cell based on a preparation process of the battery cell;

selecting a steel material for preparing the battery, stamping the steel material to obtain an upper steel shell of the battery;

acquiring user requirements and attribute parameters of a spring sheet, and determining bending parameters of the spring sheet based on the user requirements and attribute parameters of the spring sheet;

assembling a PCB board and the upper steel shell of the battery based on the bending parameters of the spring sheet, bending a negative spring sheet on a side of the PCB board towards a direction close to the battery cell, so that the negative spring sheet is in elastic contact with the upper steel shell, and bending a positive spring sheet at a bottom of the PCB board towards the direction close to the battery cell, so that the positive spring sheet is in elastic contact with a top of the battery cell, thus obtaining a complete step-down charging terminal;

fitting the complete step-down charging terminal onto the battery cell to obtain a semi-finished product of the battery, and an insulating gasket is arranged between the complete step-down charging terminal and the battery cell; and fixing the semi-finished product of the battery by roller pressing along a groove of the battery cell, and covering an insulating film on an outside of the semi-finished product after being fixed by roller pressing to obtain a finished product of the battery.

It is understood by those skilled in the art that implementing all or part of the process described in the above embodiments can be accomplished by instructing relevant hardware through a computer program. The computer program can be stored in a non-volatile computer-readable storage medium, and when executed, may implement the processes of the embodiments of the above methods. Among them, any references to memory, storage, database, or other mediums used in the embodiments provided in the present application may include non-volatile and/or volatile memory. Non-volatile memory may include Read-Only Memory (ROM), Programmable ROM (PROM), Electrically Programmable ROM (EPROM), Electrically Erasable Programmable ROM (EEPROM), or flash memory. Volatile memory may include Random Access Memory (RAM) or external high-speed cache memory. For illustration and not limitation, RAM is available in various forms such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM), Rambus Direct RAM (RDRAM), Direct Rambus Dynamic RAM (DRDRAM), and Rambus Dynamic RAM (RDRAM), etc.

Technical personnel in the field can clearly understand that, for convenience and simplicity of description, only a division of the above-described functional units and modules is exemplified. In practical applications, the above functions can be divided and assigned to different functional units or modules as needed. That is, an internal structure of the described apparatus can be divided into different functional units or modules to perform all or part of the functions described above.

The embodiments described above are intended only to illustrate technical solutions of the present application and not to limit them; although the present application has been described in detail with reference to the aforementioned embodiments, those skilled in the art should understand that they can still modify the technical solutions described in the aforementioned embodiments, or equivalently replace some of technical features; and these modifications or replacements do not make an essence of the corresponding technical solutions deviate from a spirit and scope of the technical solutions of the embodiments of the present application, all of which should be included within the scope of protection of the present application.

LISTING OF REFERENCE SIGNS 1. upper steel shell;
2. PCB board;
3. insulating gasket;
4. battery cell;
5. insulating film;
6. positive spring sheet;
7. negative spring sheet.

What is claimed is:

1. A method for preparing a No. 5 lithium-ion battery, comprising:

preparing a battery cell based on a preparation process of the battery cell;

selecting a steel material for preparing the No. 5 lithium-ion battery, and stamping the steel material to obtain an upper steel shell of the No. 5 lithium-ion battery;

acquiring user requirements and attribute parameters of a spring sheet comprising a negative spring sheet and a positive spring sheet, and determining bending parameters of the spring sheet based on the user requirements and the attribute parameters of the spring sheet;

based on the bending parameters of the spring sheet, bending the negative spring sheet on a side of a printed circuit board (PCB) downward towards a direction away from the upper steel shell, so that the negative spring sheet is configured to be in elastic contact with the upper steel shell, and bending the positive spring sheet at a bottom of the PCB downward towards the direction away from the upper steel shell, so that the positive spring sheet is configured to be in elastic contact with a top of the battery cell, then assembling the PCB and the upper steel shell of the No. 5 lithium-ion battery and thus obtaining a complete step-down charging terminal;

fitting the complete step-down charging terminal onto the battery cell to obtain a semi-finished product of the No. 5 lithium-ion battery, wherein an insulating gasket is arranged between the complete step-down charging terminal and the battery cell; and fixing the semi-finished product of the No. 5 lithium-ion battery by roller pressing along a groove of the battery cell, and covering an insulating film on an outside of the semi-finished product after being fixed by roller pressing to obtain a finished product of the No. 5 lithium-ion battery.

2. The method for preparing a No. 5 lithium-ion battery according to claim 1, wherein selecting the steel material for preparing the No. 5 lithium-ion battery, and stamping the steel material to obtain the upper steel shell of the No. 5 lithium-ion battery, comprises:

acquiring attribute data of the No. 5 lithium-ion battery, and determining stamping parameters of the steel material based on the attribute data of the No. 5 lithium-ion battery; and stamping the steel material based on the stamping parameters of the steel material to obtain the upper steel shell of the No. 5 lithium-ion battery.

3. The method for preparing a No. 5 lithium-ion battery according to claim 2, wherein the upper steel shell of the No. 5 lithium-ion battery is provided with a first through-hole and a second through-hole, the first through-hole is opened at a first end of the upper steel shell close to the battery cell, the second through-hole is opened at a second end of the upper steel shell away from the battery cell, a diameter of the first through-hole is larger than that of the second through-hole, and the diameter of the first through-hole is greater than 14 mm.

4. A computer device comprising a memory, a processor, and a computer program stored in the memory and executable on the processor, wherein the processor, when executing the computer program, implements steps of the method for preparing a No. 5 lithium-ion battery according to claim 1.

* * * * *